US011911965B2

(12) United States Patent
Barnes et al.

(10) Patent No.: US 11,911,965 B2
(45) Date of Patent: Feb. 27, 2024

(54) ULTRASONIC CONSOLIDATION OF CONTINUOUS FILAMENT MATERIALS FOR ADDITIVE MANUFACTURING

(71) Applicant: NORTHROP GRUMMAN SYSTEMS CORPORATION, Falls Church, VA (US)

(72) Inventors: Eric Barnes, Rancho Palos Verdes, CA (US); Vernon M. Benson, Morgan, UT (US); David Ivankovich, Manhattan Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 27 days.

(21) Appl. No.: 17/400,543

(22) Filed: Aug. 12, 2021

(65) Prior Publication Data

US 2023/0048983 A1    Feb. 16, 2023

(51) Int. Cl.
*B29C 64/295*    (2017.01)
*B33Y 30/00*    (2015.01)
*B29C 64/118*    (2017.01)
*B29C 64/218*    (2017.01)
*B33Y 40/10*    (2020.01)

(52) U.S. Cl.
CPC ......... *B29C 64/295* (2017.08); *B29C 64/118* (2017.08); *B29C 64/218* (2017.08); *B33Y 30/00* (2014.12); *B33Y 40/10* (2020.01)

(58) Field of Classification Search
CPC .... B29C 64/295; B29C 64/118; B29C 64/218
See application file for complete search history.

(56) References Cited

U.S. PATENT DOCUMENTS

| 4,569,716 A | * | 2/1986 | Pugh ................... B29C 65/1467 |
| | | | 156/577 |
| 6,511,563 B2 | | 1/2003 | Roylance et al. |
| 9,782,928 B2 | | 10/2017 | Barnes et al. |
| 10,882,261 B2 | | 1/2021 | Graf et al. |

(Continued)

FOREIGN PATENT DOCUMENTS

| WO | 2020210054 A1 | 10/2020 |
| WO | 2020210056 A1 | 10/2020 |

*Primary Examiner* — Nahida Sultana
*Assistant Examiner* — Mohamed K Ahmed Ali
(74) *Attorney, Agent, or Firm* — Shumaker, Loop & Kendrick, LLP; John A. Miller

(57) ABSTRACT

A continuous filament additive manufacturing machine for building a part by laying down a continuous mono-filament or composite filament material layer by layer on a tool or substrate. The machine includes a system, such as a robot, operable to move in at least three degrees of freedom, and a placement module coupled to the system and being configured to deposit the continuous filament material. The placement module includes a guide for guiding the material to the part, a heat source for pre-heating the material as it is being deposited from the placement module and a compaction device for compacting the material as it is being deposited from the placement module. The compaction device includes an ultrasonic horn that is ultrasonically vibrated to melt or flow the material and cause the material to fuse and be compacted to the tool or substrate.

22 Claims, 12 Drawing Sheets

(56) References Cited

U.S. PATENT DOCUMENTS

| | | | |
|---|---|---|---|
| 2015/0314539 A1* | 11/2015 | Sanchez Gomez | B29C 70/543 |
| | | | 156/510 |
| 2017/0113405 A1* | 4/2017 | Gandhi | B29C 64/393 |
| 2019/0202118 A1 | 7/2019 | Alfson et al. | |
| 2019/0315055 A1 | 10/2019 | Tyler | |
| 2019/0389148 A1 | 12/2019 | Wadsworth | |
| 2020/0276774 A1* | 9/2020 | Kisch | B29C 35/16 |
| 2020/0324458 A1 | 10/2020 | Barnes et al. | |
| 2020/0324459 A1 | 10/2020 | Barnes et al. | |
| 2020/0324460 A1 | 10/2020 | Barnes et al. | |
| 2020/0324474 A1 | 10/2020 | Barnes et al. | |
| 2020/0346399 A1 | 11/2020 | Huttunen et al. | |
| 2021/0016522 A1* | 1/2021 | Futakuchi | B29C 70/38 |

* cited by examiner

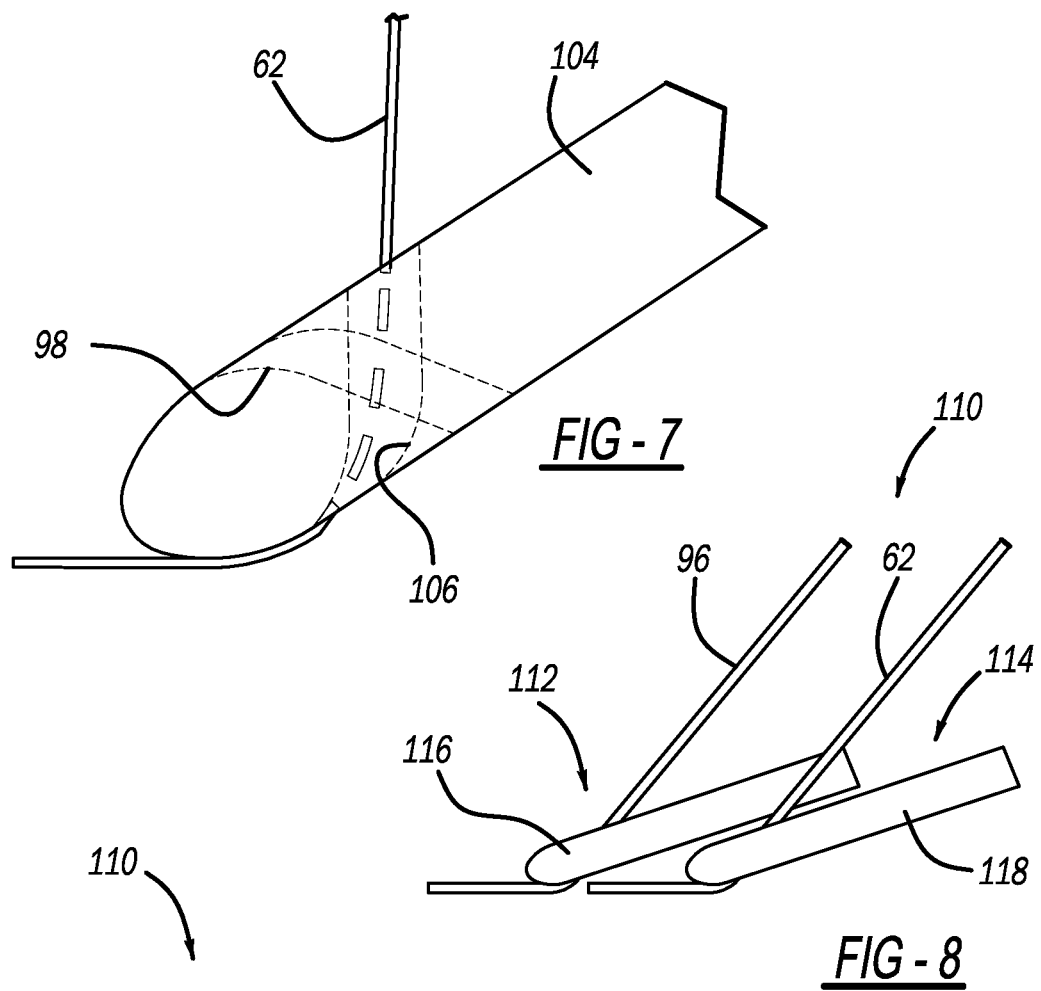
*FIG - 7*
*FIG - 8*
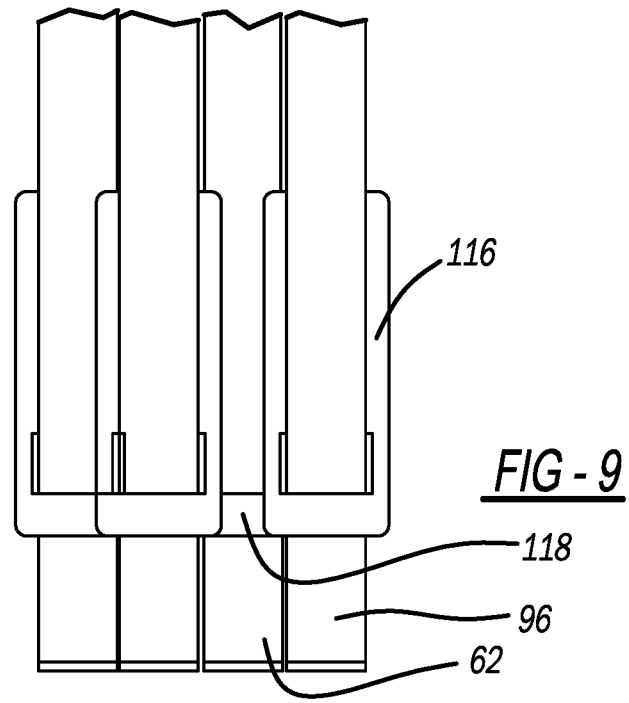
*FIG - 9*

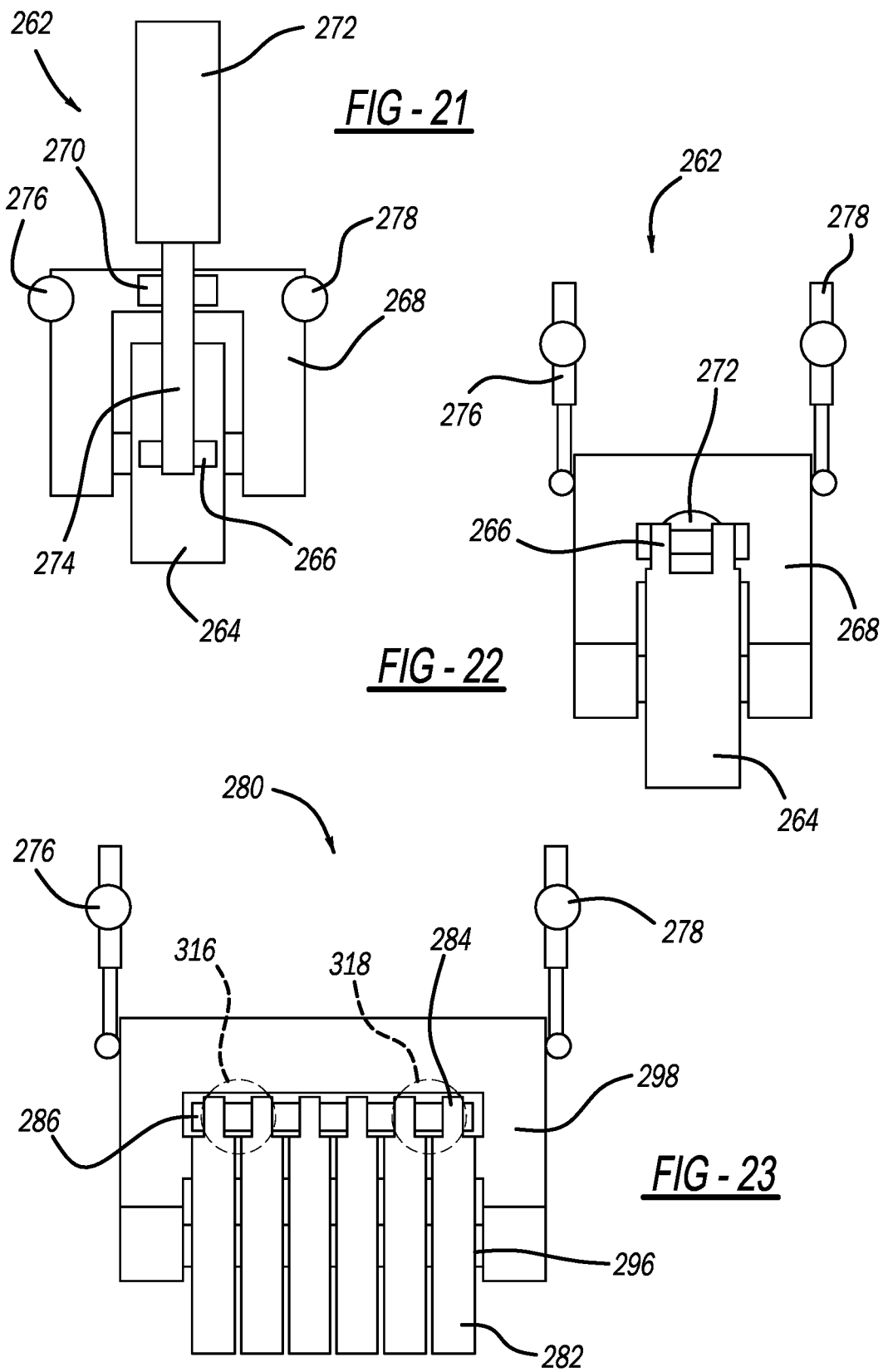

ULTRASONIC CONSOLIDATION OF CONTINUOUS FILAMENT MATERIALS FOR ADDITIVE MANUFACTURING

BACKGROUND

Field

This disclosure relates generally to a continuous filament additive manufacturing machine and, more particularly, to a continuous filament additive manufacturing machine that includes a heat source involving an ultrasonic compaction device that helps melt and consolidate the continuous filament material as it is being deposited to help fuse it to previously deposited layers and control the height of the deposited layers.

Discussion

Fused filament fabrication (FFF) is an additive manufacturing (AM) process for 3D printing. Typically, a feedstock material, such as a continuous filament from a spool or pellets from a hopper, is or are provided to a heated nozzle, where it is extruded therefrom as a heated molten filament to be deposited as adjacent rows of strips to form a layer, and where the molten filaments (fiber reinforced or unreinforced) immediately begin to harden once they are extruded from the nozzle. Multiple layers are built up in this manner in a certain configuration to produce a desired part. Alternately, the filament can be heated externally from the nozzle, such as by a laser, and rolled onto the part as it is being built up.

Continuous filament material without fiber reinforcement is typically called mono-filament and contains only the polymer material or matrix material. Continuous filament material with fiber reinforcement is often called composite filament and contains the fiber reinforcement and the polymer or matrix material. Various materials can be used for FFF, such as high performance amorphous or semi-crystalline thermoplastics including polyetheretherketone (PEEK), polyetherketoneketone (PEKK), polyphenylsulfone (PPSF or PPSU), polyetherimide (PEI) and polyphenylene (PPS). Other materials that may be suitable for FFF include acrylonitrile butadiene styrene (ABS), polylactic acid (PLA), polycarbonate (PC), polyamide (PA), polystyrene (PS), lignin and rubber. The filament can be reinforced with discontinuous fibers or continuous fibers. Examples of common fibers include carbon fibers, glass fibers, quartz fibers and Kevlar fibers. Other materials that can be used in filament form include ultra-high molecular weight polyethylene (UHMWPE), Dyneema, high impact polystyrene (HIPS), nylon, high density polyethylene (HDPE) eutectic materials, plasticine, room temperature vulcanization (RTV) silicones, etc. Continuous fiber filaments, such as continuous carbon fiber (CCF) filaments, tend to be of higher strength and are desired for certain products. These filaments may have continuous carbon, or other, fibers that extend from one end of the filament to the other end of the filament and are encapsulated in a suitable polymer to provide the desired matrix strength. Additionally, the carbon fibers can be chopped or sectioned so that they are not continuous from one end of the filament to the other end of the filament, and are also impregnated/held together with a suitable matrix.

Known additive manufacturing 3D printing machines often employ a gantry style approach having an end-effector that lays down the additive material in the x-y plane. However, gantry style machine approaches make scalability, affordability and flexibility a challenge for a fabrication cell because there is a direct correlation between the size of the part being fabricated and the size of the gantry machine required, where the gantry machine is capable of only a single operation at one time. Very large parts require very large machines, thus driving the required footprint and machine cost. Robotic approaches provide greater flexibility and easier scale-up. For example, multiple robots can work within the same cell. Additionally, each robot can be mounted to a movable base that allows for repositioning at different locations within or around the cell. Robotic approaches allow for additional robot poses that increase the number of degrees of freedom, the ability to fabricate in 3D, and fabrication flexibility through multiple robots performing multiple tasks. One known system of this type is the scalable composite robotic additive manufacturing (SCRAM) system available from Electroimpact, which is an industrial true 6-axis continuous fiber-reinforced 3D printer that enables the tool-less rapid fabrication of aerospace-grade integrated composite structures.

The nature of additive manufactured thermoplastic materials allows for fully consolidated materials to be fabricated without post processing, such as employing ovens, autoclave or other energy additive methods to fully polymerize the composite matrix for strength and rigidization. However, additive manufactured continuous filament composite structures fabricated using a placement head and mono-filament or composite filament (reinforced with fibers) or other configured reinforcements, such as woven strips, braided tubes or the like, will lack interlaminar strength if the interfaces between adjacent layers are not intimately fused together to eliminate voids or cold bonds.

SUMMARY

The following discussion discloses and describes a continuous filament additive manufacturing machine for building a part by laying down a continuous material layer by layer on a tool or substrate. The machine includes a system, such as a robot, operable to move in six degrees of freedom, and a placement module coupled to the system and being configured to deposit the continuous filament material. The placement module includes a guide for guiding the material to the part, an optional heat source for pre-heating the material as it is being deposited from the placement module and an ultrasonic compaction device for compacting the material as it is being deposited from the placement module. The compaction device includes an ultrasonic horn that is ultrasonically vibrated to melt and flow the material, and cause the material to be fused and compacted to the part, while maintaining a pre-programmed position of the upper surface of the deposited material.

Additional features of the disclosure will become apparent from the following description and appended claims, taken in conjunction with the accompanying drawings.

BRIEF DESCRIPTION OF THE DRAWINGS

FIG. 7 is a broken-away side view of a horn for an ultrasonic compaction device including two through-holes oriented 180° relative to each other;

FIG. 8 is a side view of an ultrasonic compaction assembly including two staggered rows each having two ultrasonic compaction devices including horns each having a through-hole;

FIG. 9 is a top view of the ultrasonic compaction assembly shown in FIG. 8;

FIG. 21 is a top view of the ultrasonic compaction device separated from the module shown in FIG. 20;

FIG. 22 is a front view of the ultrasonic compaction device separated from the module shown in FIG. 20;

FIG. 23 is a front view of an ultrasonic compaction device including multiple reciprocating disk horns;

DETAILED DESCRIPTION OF THE EMBODIMENTS

The following discussion of the embodiments of the disclosure directed to a continuous filament additive manufacturing machine that includes a heat source and an ultrasonic compaction device that melts the matrix material as it is being deposited to fuse it to previously deposited layers is merely exemplary in nature, and is in no way intended to limit the disclosure or its applications or uses.

Figure 1:
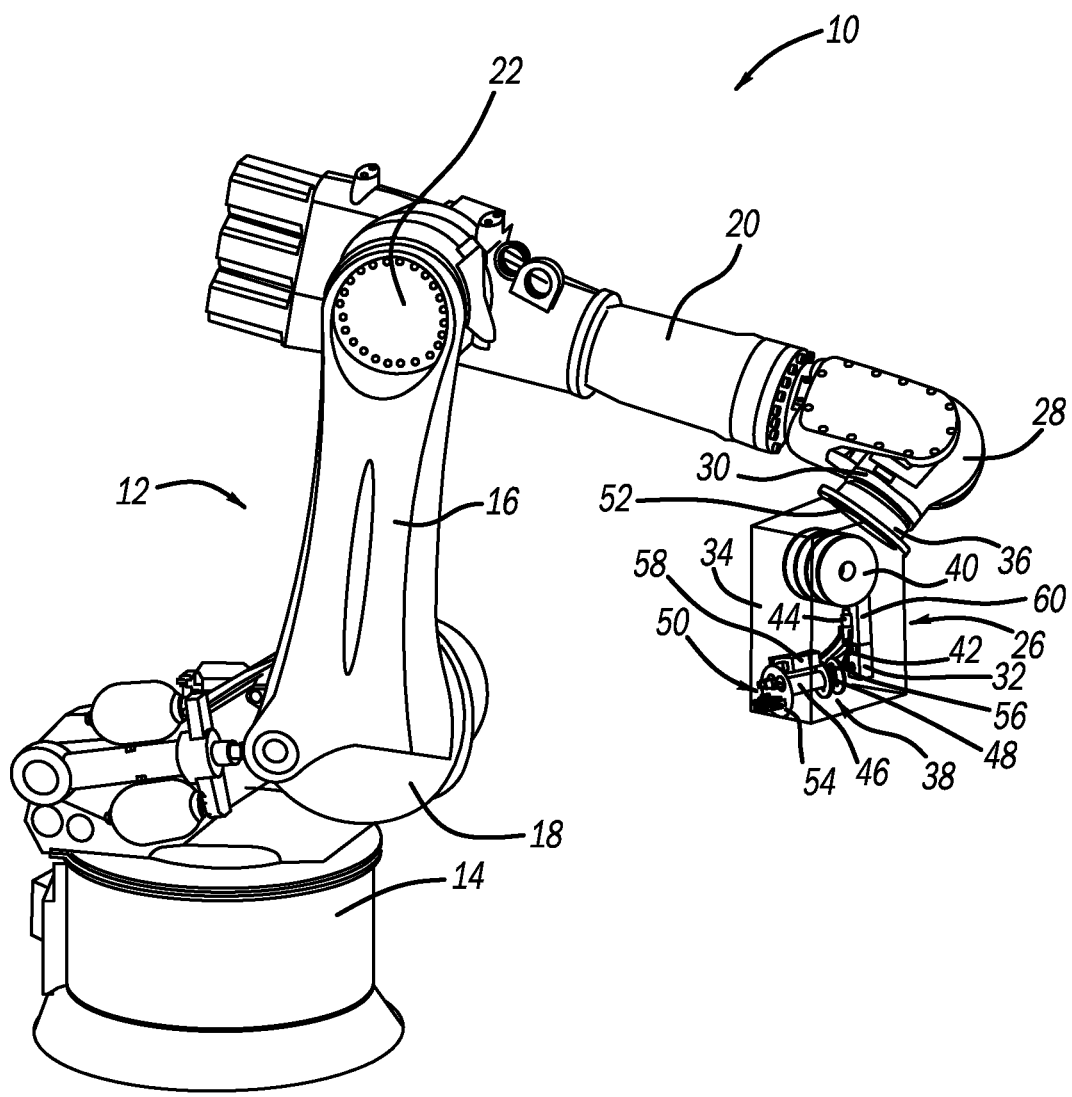
FIG. 1 is an isometric view of a 3D printing machine including a robot and an end-effector.

FIG. 1 is an isometric view of a 3D printing machine 10 including a robot 12 having a base portion 14, an extension arm 16 coupled to the base portion 14 by a rotary and pivot joint 18, and a working arm 20 coupled to the extension arm 16 opposite to the base portion 14 by an elbow pivot joint 22. An end-effector 26 is coupled to the working arm 20 at an angle opposite to the joint 22 by a pivot joint 28 having a coupling mechanism 30. The robot 12 is intended to represent any suitable positioning device for the end-effector 26. The end-effector 26 operates as a print-head assembly for laying down a molten composite filament, mono-filament, etc. for building a complex structure as described herein. Various end-effectors for various applications can be attached to the robot 12. It is noted that during operation, the machine 10 may or may not be positioned within an oven (not shown) so that the temperature of the printing process and the ambient temperature surrounding the part is controlled.

The end-effector 26 includes an outer housing 34 and a rotatable connector 36 that is releasably and rotatably connected to the coupling mechanism 30, where the housing 34 is shown as being transparent to illustrate the various components therein. Those components include a number of spools here three, on which a plurality of filaments 42 of various materials are wound, a motor 44 for selectively and independently drawing the filaments 42 off of the spools 40, a right angle gear box 32 coupled to a filament feed assembly 48 by a shaft 56, a rotary assembly 38 having a barrel 46 that is turned by an indexing motor 58 and through which the filaments 42 are drawn and melted, an end plate 54 mounted to an end of the barrel 46 and a nozzle assembly 50 that extends through the plate 54 and is part of the extruder module. The spools 40 can be mounted in the end-effector 26 as shown, or mounted remotely with the material being fed to the end-effector 26 through a tube (not shown).

This disclosure proposes various devices and assemblies for ultrasonically compacting and consolidating additive manufactured monomer parts and fiber reinforced composite parts that improve filament adhesion, interlaminar properties, part tolerance, surface smoothness, and reduces part porosity. By applying ultrasonic compaction during the process of laminating the layers that occurs in the additive manufacturing process, interlaminar strengths and product consistency/quality can be improved, and enable application to increased composite material applications. The disclosure more specifically describes a continuous filament additive manufacturing machine that includes an ultrasonic compaction and consolidation device to melt/flow the filament matrix material and fuse it to the previous layer or onto the tool surface. The ultrasonic compaction and consolidation device may be combined with mechanical, laser and/or thermal energy. The ultrasonic consolidation can occur while the part is in the midst of part build or at the end of part build. The ultrasonic consolidation can be used to preheat the tool for better bonding with the new material being applied as well as the new material being added to the tool. The ultrasonic consolidation can be performed at each layer or a designated number of layers. The ultrasonic consolidation can be localized to particular locations or features. The process can be performed either manually or via an automated and/or robotically integrated fabrication system.

Figure 2:
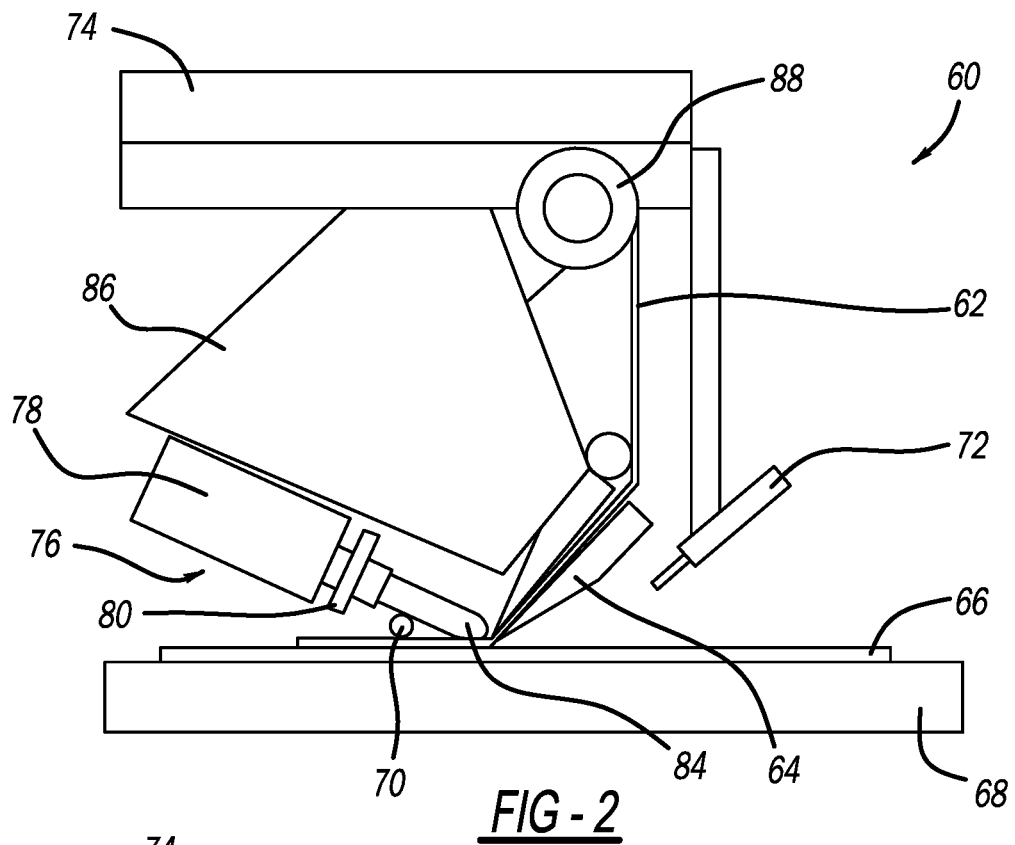
FIG. 2 is a broken-away side view of a continuous filament placement module including an ultrasonic compaction device and a laser that can be used in the end-effector for the machine shown in FIG. 1.

FIG. 2 is a broken-away side view of a continuous filament placement module 60 that is one non-limiting example of the type of module that can be provided in connection with the end-effector 26, where the module 60 includes the necessary components and elements to perform the operations discussed herein. The module 60 includes a robotic head interface 74 for coupling the module to the robot 12 and a body portion 86. A suitable filament or ribbon 62 (multiple filaments joined together into a flat rectangular shape), typically a monofilament or a composite filament composed of thermoplastic matrix encapsulating fibers, such as a continuous fiber filament, a short fiber filled filament, a particle filled filament, a blended monomer filament or a long discontinuous reinforced filament extruded material, is drawn from a spool 88 through a ribbon guide 64 and is laid down on a part 66 as it is being built up on a tool 68 in the manner described above, where the module 60 is moved from left to right. The ribbon 62 is referred to as a ribbon herein because of its planar cross-sectional shape. However, other shaped composite materials can also be employed, such as round filaments. A diffuse laser 72 mounted to a leading side of the module 60 directs a laser beam onto a backside of the ribbon 62 as it exits the module 60 and the underlying layer or the tool 68 to melt or flow the ribbon 62 to fuse the ribbon 62 and form the part 66. A chilled roller 70 helps hold compaction and extract heat to solidify the ribbon 62 to the part 66.

An ultrasonic compaction device 76 is mounted to a following side of the module 60 in any suitable manner so that it has a desired low angle relative to the tool 68. The device 76 includes a converter 78 that houses the device electronics, a multiplier or booster 80 that amplifies the ultrasonic signal through a zero motion connection point to an ultrasonic horn 84. The horn 84 contacts a front side of the ribbon 62 as it exits the module 60, and is ultrasonically vibrated to provide additional heating to melt or flow the ribbon 62 and cause the ribbon 62 to further fuse and compact to the part 66 to reduce voids, inclusions, bubbles, etc., sometimes referred to as ultrasonic tape lamination (UTL). The module 60 includes the necessary components to provide the desired pressure of the horn 84 and the roller 70 on the ribbon 62, where air pressure may be employed, or their position may be held in a fixed position in space relative to the tool/part surface, controlled by the robot 12, and the material melted and compacted to the fixed height.

Figure 3:
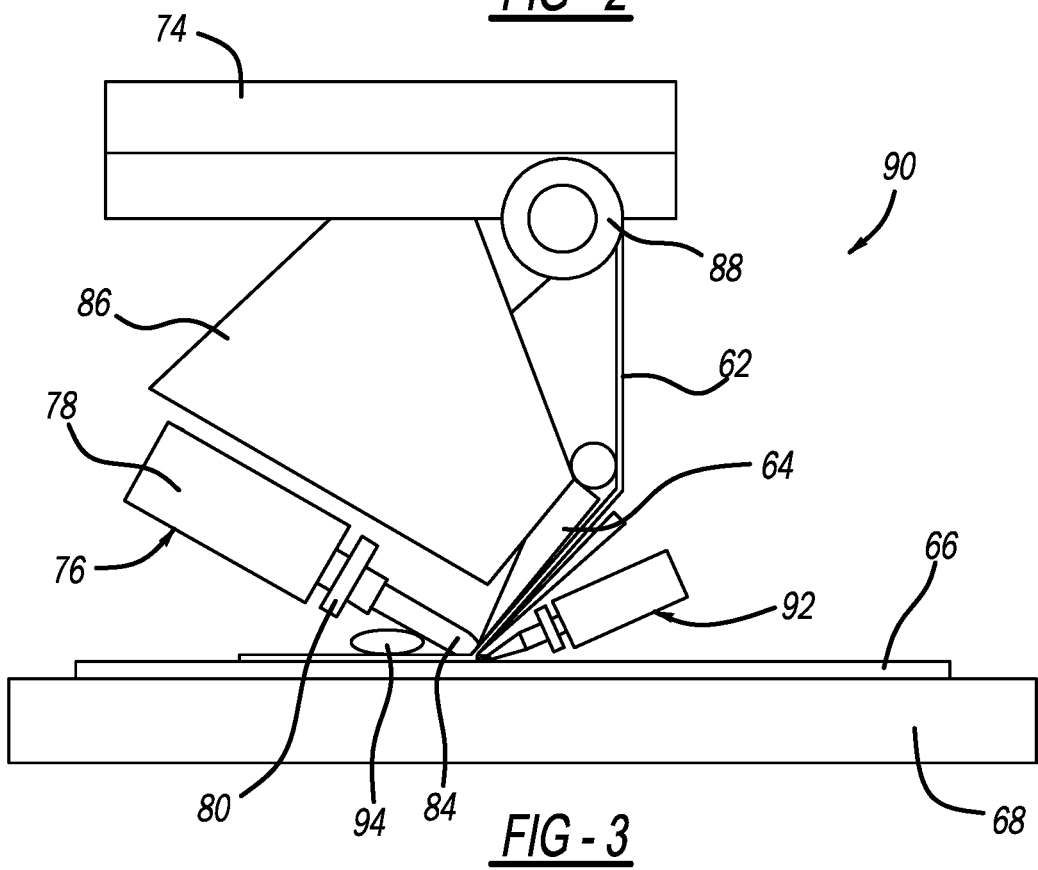
FIG. 3 is a broken-away side view of a continuous filament placement module including an ultrasonic pre-heating source and an ultrasonic compaction device used in combination, along with an active cooling/consolidation element that can be used in the end-effector for the machine shown in FIG. 1.

The module 60 employs a laser to melt or flow the ribbon 62 and the part 66. However, other modules may employ other heating sources for the same purpose. FIG. 3 is a broken-away side view of a continuous filament placement module 90 that is similar to the placement module 60, where like elements are identified by the same reference number. In this embodiment, the laser 72 is replaced with a heat source 92 that is also mounted to a leading side of the module 90 and pre-heats the part 66 prior to fusion of the ribbon 62 and the part 66 with the ultrasonic horn 84 to form the part 66. The heat source 92 can be any heat source suitable for the purposes described herein, such as an ultrasonic device similar to the device 76, an induction heater, an infrared heater, etc. In addition in this embodiment, the roller 70 is replaced with a skid 94 that is mounted to the following side of the module 90 so that it contacts the ribbon 62 as it is being laid down. Pressure is applied to the skid 94 to provide further compaction of the ribbon 62 to the part 66, where the skid 94 is cooled to solidify the ribbon 62 in a consolidated state.

Figure 4:
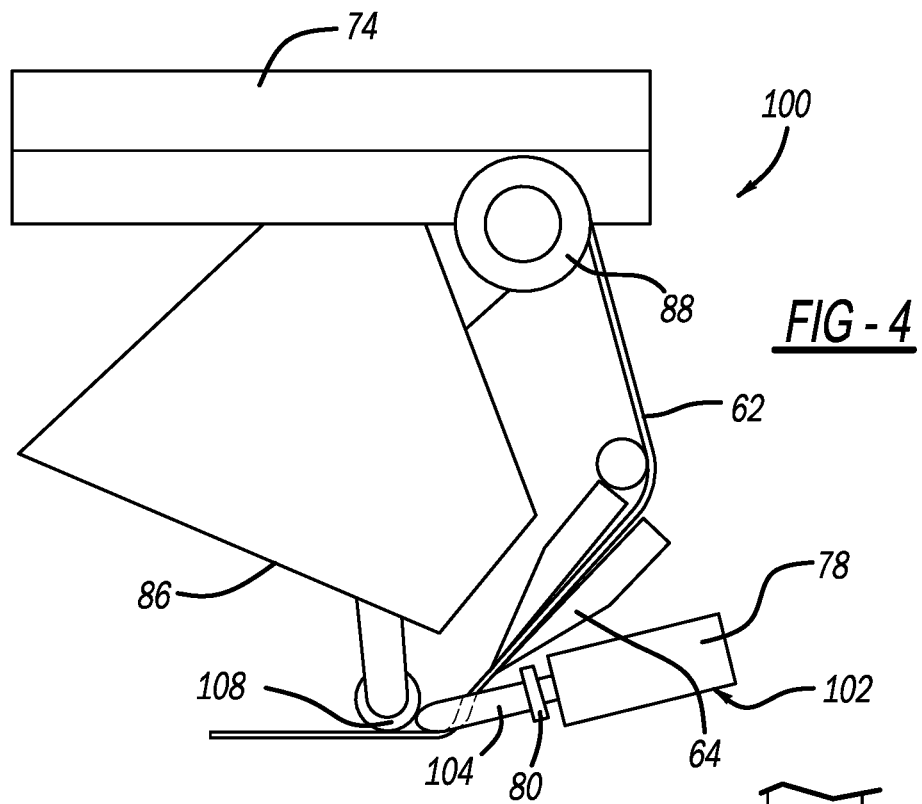
FIG. 4 is a broken-away side view of a continuous filament placement module including an ultrasonic compaction device having a horn with a pass-through hole that can be used in the end-effector for the machine shown in FIG. 1.
Figure 5:
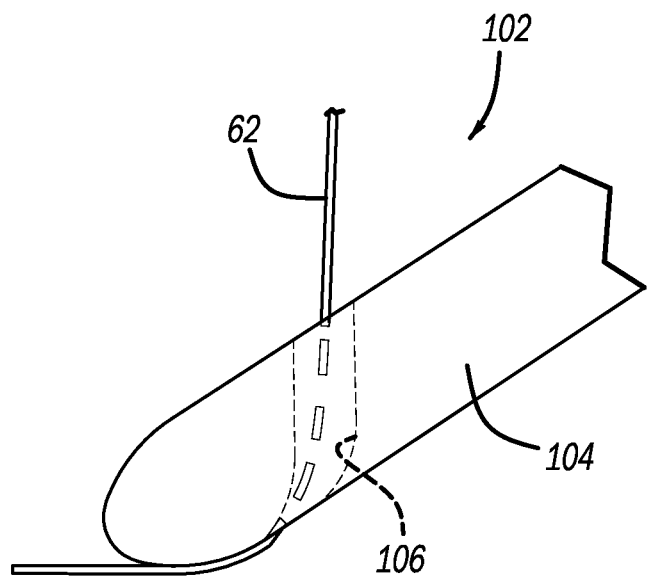
FIG. 5 is a broken-away side view of the horn shown in FIG. 4.
Figure 6:
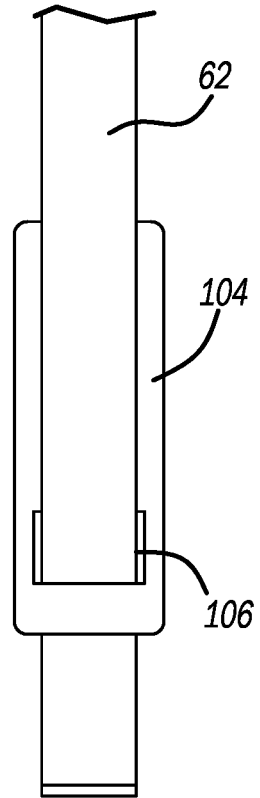
FIG. 6 is a broken-away top view of the horn shown in FIG. 4.

Different ultrasonic compaction device designs can be employed to improve packaging with other components of the additive manufacturing head and increase the heating efficiency and compaction of the ribbon 62. FIG. 4 is a broken-away side view of a continuous filament placement module 100 that is similar to the placement module 60, where like elements are identified by the same reference number. In this embodiment, the laser 72 is replaced with an ultrasonic compaction device 102 including a horn 104 that is mounted to a leading side of the module 100 so that the ribbon 62 passes through an opening in the horn 104 and passes under the horn tip where it melts or flows the ribbon 62 to fuse the ribbon 62 and form the part 66. The horn 104 includes a curved guide hole 106 through which the ribbon 62 passes that acts as a guide for the ribbon 62 to improve the packaging of the compaction source with the additive manufacturing head. A chilled roller 108 helps form the ribbon 62 to the part 66 by holding the consolidation while cooling the ribbon 62 to a solidified temperature. FIG. 5 is a broken-away side view and FIG. 6 is a broken-away top view of the horn tip separated from the device 102 to better illustrate the curved hole 106.

Horns of this type are subject to wear as the material passes across the surface where it rubs or is compacted. In another embodiment, shown in FIG. 7, the horn 104 includes another curved guide hole 98 oriented 180° relative to the hole 106 so that the horn 104 can be rotated or indexed 180° where the hole 98 will be positioned at the same location that the hole 106 was previously positioned to accept the ribbon 62. Thus, if wear on the horn 104 reduces its performance, the horn 104 can be rotated without shutting down the additive manufacturing process. It is noted that in order for rotation of the horn 104 to be effective as described it needs to be symmetrical. However, for other applications not requiring the horn to be rotated, other shapes may be applicable.

Some placement modules designs allow multiple ribbons 62 to be laid down simultaneously. However, in this and other embodiments the particular horn may be wider than the ribbon it is depositing. Therefore, a space or gap will occur between adjacent rows of the ribbons 62, which may be undesirable for part integrity or otherwise. By staggering and off-setting multiple horns where one horn is in front of or behind another horn, that gaps can be eliminated. FIG. 8 is a side view and FIG. 9 is a top view of an ultrasonic compaction assembly 110 including two staggered rows 112 and 114 each having two compaction devices including horns 116 and 118 each having a guide hole and that are off-set relative to each other. Particularly, the horns 116 and 118 are positioned relative to each other so that ribbons 96 deposited by the following horns fill the gaps between the ribbons 62 deposited by the leading horns. The multiple horns and associated material delivery paths allows independent motion of the narrow ribbons of material as the contour of the build-up changes to avoid buckling or distortion.

Figure 10:
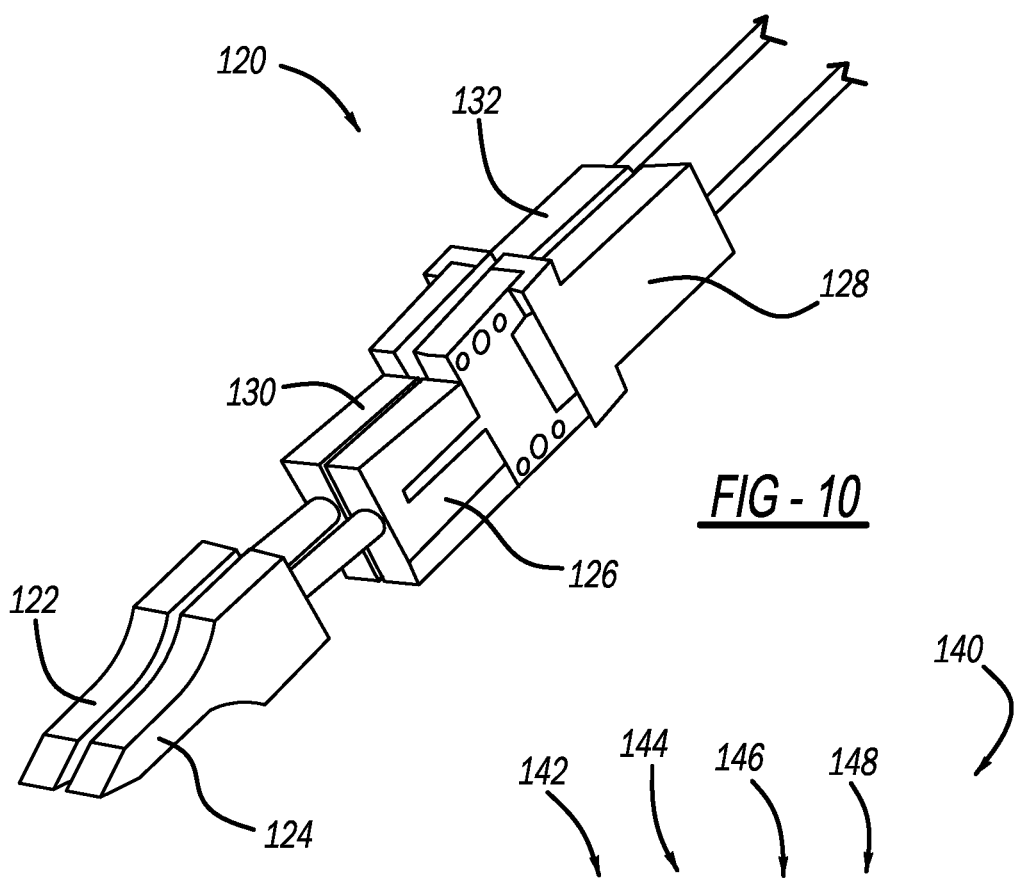
FIG. 10 is an isometric view of an ultrasonic compaction device including a pair of spaced apart and flat horns.

The ultrasonic converter/booster/horn assemblies discussed above are generally round in configuration. It is possible to reconfigure the ultrasonic assemblies to be flat so that they can be closely spaced together and more closely follow the contours of the part 66, where multiple ribbons can be laid down simultaneously and where there is not a significant gap between the horns. This embodiment is illustrated in FIG. 10 showing an ultrasonic compaction device 120 including a pair of spaced apart and flat horns 122 and 124 connected to respective boosters 130 and 126 and converters 132 and 128. A second compaction device with multiple horns can also be mounted to the same module as the compaction device 120 in a staggered manner similar to the compaction assembly 110 to provide ribbon overlap.

Figure 11:
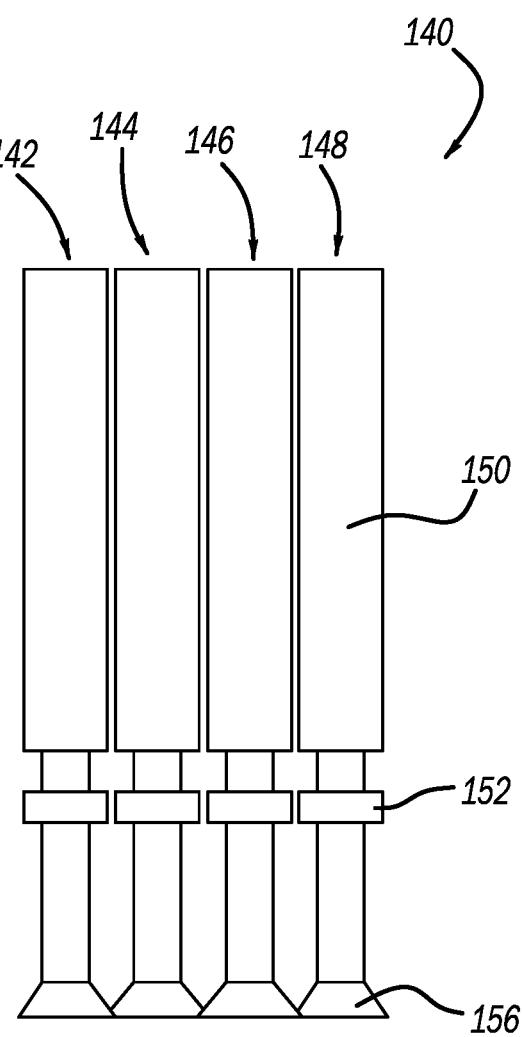
FIG. 11 is a top view of an ultrasonic compaction assembly including two staggered rows each having two ultrasonic compaction devices with flat horns.

An ultrasonic compaction assembly 140 is illustrated in FIG. 11 including four ultrasonic compaction devices 142, 144, 146 and 148 each including a converter 150, a booster 152 and a horn 156, where the horn 156 is wider than the space between adjacent devices. The devices 142 and 146 are on one compaction plane and the devices 144 and 148 are on another compaction plane so that the horns 156 do not interfere with each other.

Figure 12:
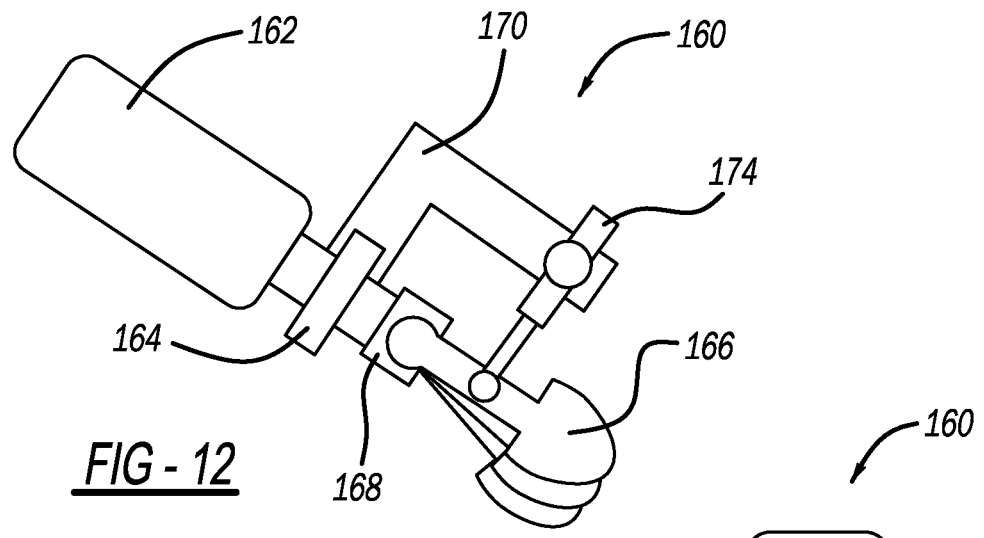
FIG. 12 is a side view of an ultrasonic compaction device including a single converter, a single booster and multiple horns with independent motion to conform to surface contour.
Figure 13:
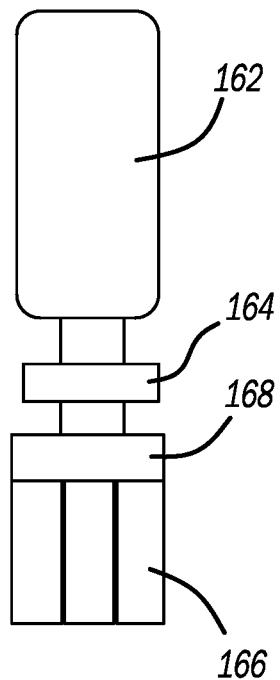
FIG. 13 is a top view of the ultrasonic compaction device shown in FIG. 12.

Providing multiple ultrasonic horns side-by-side that simultaneously compact multiple filaments or ribbons presents a challenge if the ribbons are being built up on a contoured surface because the horns generally do not move independently of each other. FIG. 12 is a side view and FIG. 13 is a top view of an ultrasonic compaction device 160 including a single converter 162 and a single booster 164. Multiple spaced apart horns 166, here three, are independently and pivotally mounted to a mounting bar 168 coupled to the booster 164. An arm 170 is also coupled to the booster 164 at its zero motion point and a separate pneumatic actuation device 174 is mounted to the arm 170 and each of the horns 166. The arm 170 does not vibrate and the pneumatic devices 174 apply pressure to the horns 166 as they compact the ribbons being simultaneously deposited. Therefore, as the device 160 moves in combination with the module during part buildup, the horns 166 will separately move up and down with the contour of the part 66 and against the bias of the pneumatic actuation device 174. It is noted that in some cases it may be desirable to fix the position of the individual horns, thus eliminating the pneumatic actuation device 174, and allowing the robot 12 to control the positioning of the horns 166 in space.

Figure 14:
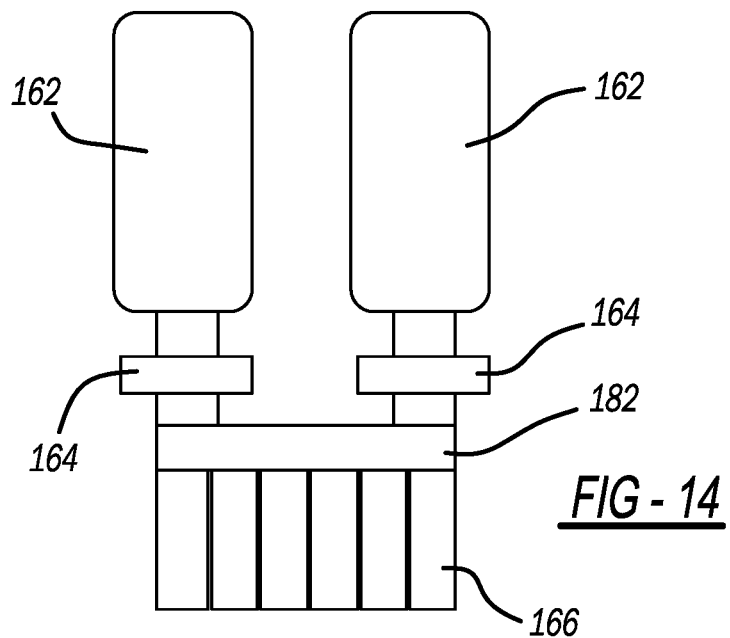
FIG. 14 is a top view of an ultrasonic compaction device including two synchronized converters, two boosters and multiple horns.

If the number of ribbons that are being laid down at the same time increases beyond some limit, it may be desired to employ multiple converters and boosters in a single compaction assembly of the type discussed above. This is illustrated in FIG. 14 showing a top view of an ultrasonic compaction device 180 similar to the compaction device 160, where like elements are identified by the same reference number. In this design, the compaction device 180 includes six of the horns 166 each being separately pivotally coupled to a mounting bar 182, where the mounting bar 182 is coupled to two of the boosters 164 and two of the converters 162. The two converters 162 are synchronized so that the proper motion of the horns 166 is provided.

Figure 15:
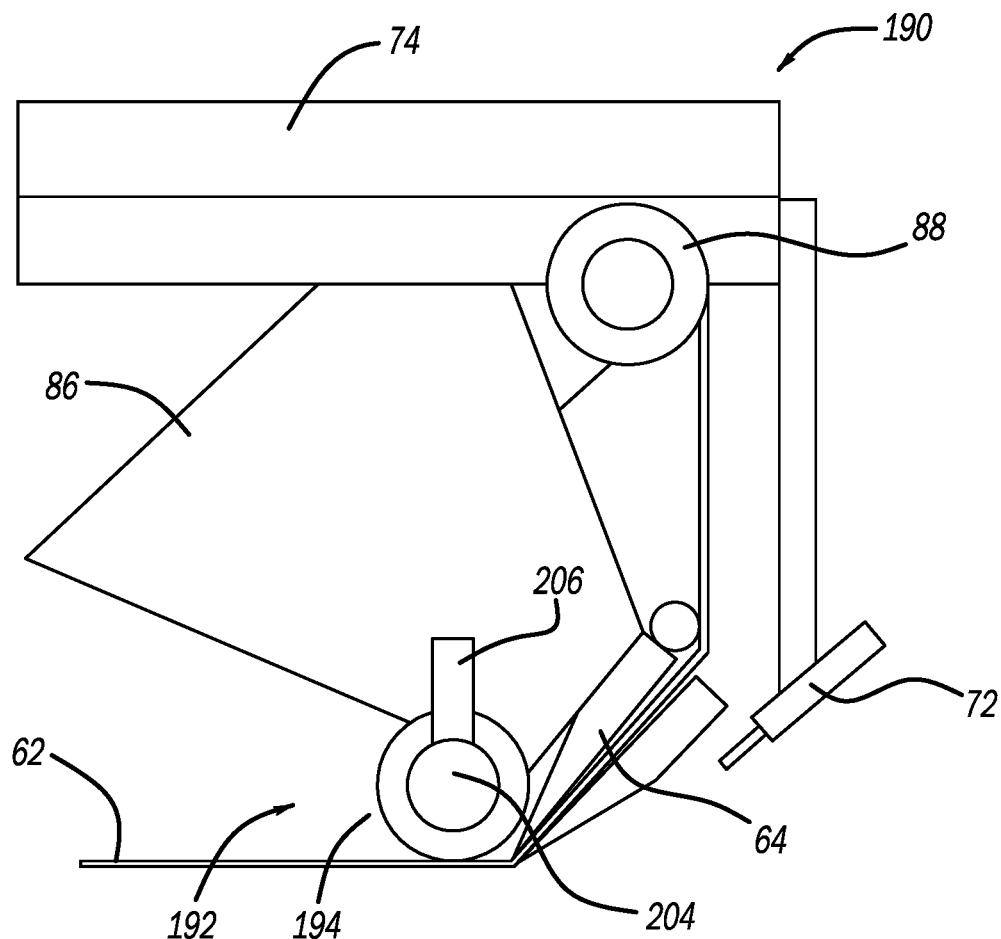
FIG. 15 is a broken-away side view of a continuous filament placement module including an ultrasonic compaction device having multiple roller horns and transverse actuation that can be used in the end-effector for the machine shown in FIG. 1.
Figure 16:
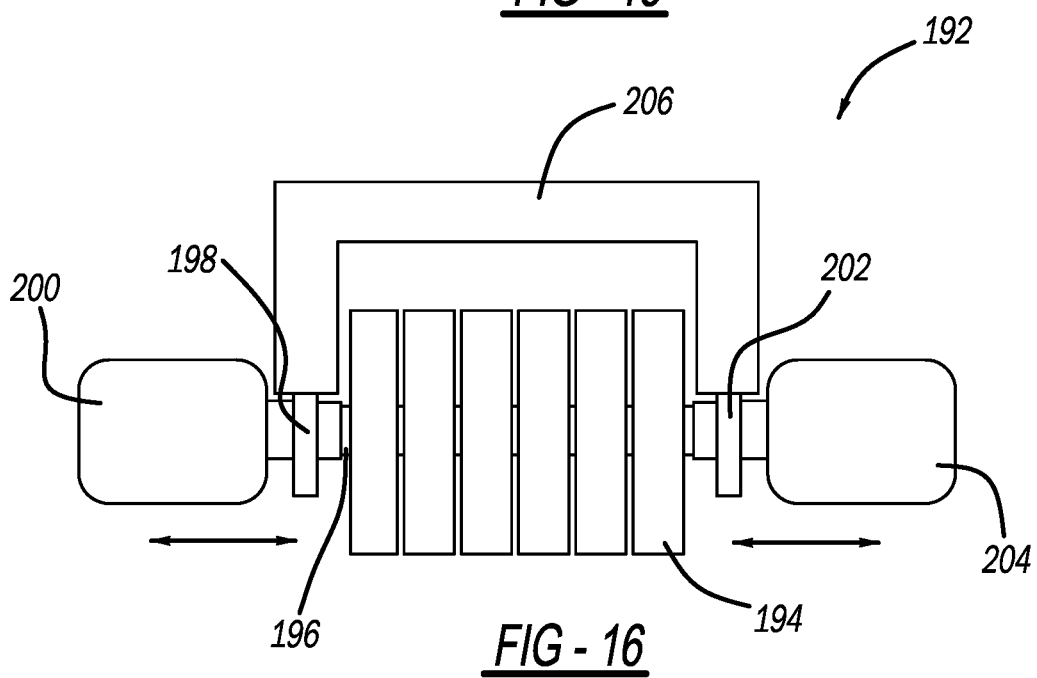
FIG. 16 is a top view of the ultrasonic compaction device separated from the module shown in FIG. 15.

Other configurations of an ultrasonic compaction device of the type being discussed herein may provide various advantages, such as compact packaging. FIG. 15 is a broken-away side view of a continuous filament placement module 190 similar to the module 60, where like elements are identified by the same reference number. In this design, the ultrasonic compaction device 76 is replaced with an ultrasonic compaction device 192, where FIG. 16 is a top view of the device 192 separated from the module 190. For the designs discussed above, the ultrasonic horns were vibrated in a direction parallel to the direction that the ribbon 62 was being laid down. For the module 190, the ultrasonic horns are vibrated in a direction perpendicular to the direction that the ribbon 62 is being laid down. Particularly, the device 192 includes a plurality of spaced apart circular roller horns 194 rotatably mounted to a common shaft 196. One end of the shaft 196 is secured to one ultrasonic drive made up of a booster 198 and a converter 200 and the other end of the shaft 196 is secured to another ultrasonic drive made up of a booster 202 and a converter 204, where a mounting arm 206 is secured to the boosters 198 and 202. The converters 200 and 204 and the boosters 198 and 202 are synchronized and axially vibrate the shaft 196, which vibrates the horns 194 transverse to the rolling direction of the horns 194. The horns 194 thus also provide additional ribbon compaction from applied pressure. It is noted that the number of the roller horns 194 is six in this design. However, this is by way of example in that any suitable number of the roller horns 194 can be employed to lay down any suitable number of ribbons, where the number of ribbons can be less or more than the number of the roller horns 194. It is also noted that the number of ultrasonic converter and booster combinations is two in FIG. 16. However, a single converter and booster combination could be used depending on the number of ribbons and material being compacted.

Figure 17:
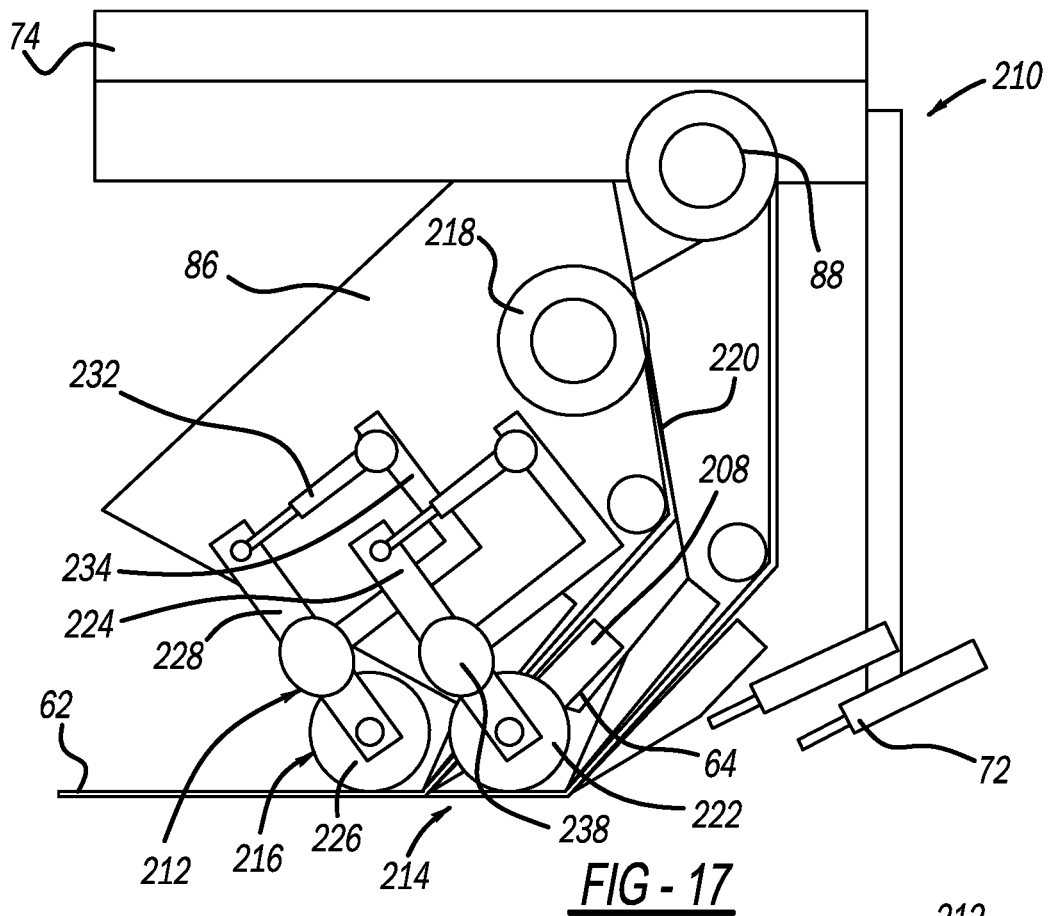
FIG. 17 is a broken-away side view of a continuous filament placement module including an ultrasonic compaction assembly having two staggered rows of ultrasonic compaction devices with multiple roller horns and transverse actuation that can be used in the end-effector for the machine shown in FIG. 1.
Figure 18:
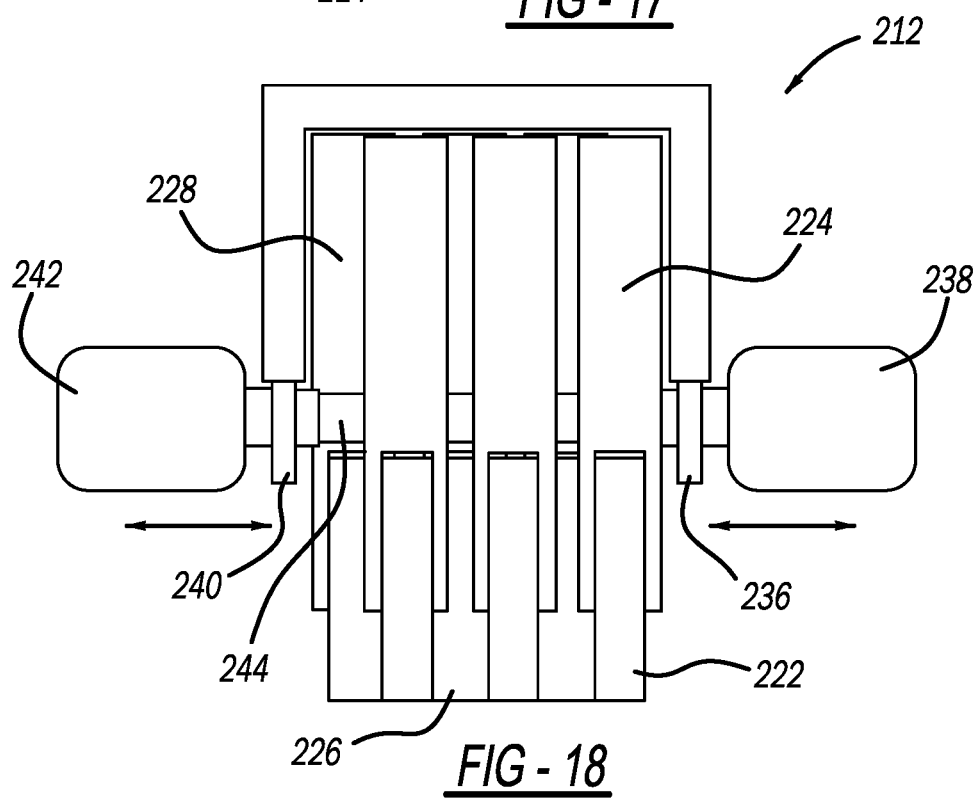
FIG. 18 a top view of the ultrasonic compaction device assembly separated from the module shown in FIG. 17.
Figure 19:
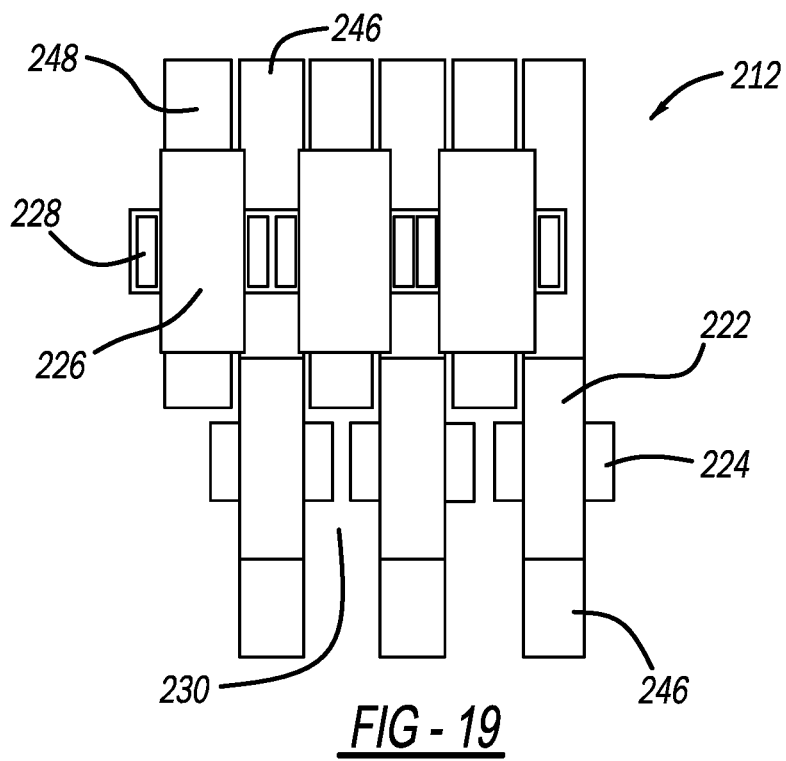
FIG. 19 a top view of the ultrasonic compaction device assembly separated from the module shown in FIG. 17 and showing ribbon placement and overlapping compaction footprints on a second set of rollers.

There needs be a small gap between the roller horns 194 in order for them to independently vibrate and roll. However, it may be desirable to provide ultrasonic compaction of the material aligned with those gaps. FIG. 17 is a broken-away side view of a continuous fiber placement module 210 similar to the module 60, where like elements are identified by the same reference number. In this design, the ultrasonic compaction device 76 is replaced with an ultrasonic compaction device assembly 212 including a front ultrasonic compaction device 214 and a rear ultrasonic compaction device 216, where FIG. 18 is a top view of the assembly 212 separated from the module 210. A second spool 218, ribbon 220 and ribbon guide 208 are provided for the compaction device 216. The front compaction device 214 includes a set of three roller horns 222, where each horn 222 is rotatable on a separate extension arm 224. The rear compaction device 216 includes a set of three roller horns 226, where each horn 226 is rotatable on a separate extension arm 228, and where the roller horns 226 are wider than the roller horns 222 and wider than the ribbons 62 being compacted, and are aligned to overlap the compaction footprint of the roller horns 222 so that no small un-compacted gap exists at the ribbon interfaces. The arms 224 and 228 extend from the roller horns 222 and 226, respectively, to act as a counter weight and provide a location where the horns 222 and 226 can be compressed against the ribbon 62 by pneumatic devices 232 coupled to extension arms 234. Each of the arms 224 is secured to a booster 236 and converter 238 at one end and to a booster 240 and converter 242 at an opposite end by a shaft 244. A pair of boosters and converters are also used to vibrate the roller horns 226 in the same manner. It is noted that although two converter and booster sets are shown per roller set, in some cases only one converter and booster set would be needed per roller set. It is also noted that in some cases it is advantageous to fix the position of the ultrasonic horns in space, thus eliminating the pneumatic devices 232, and allowing the robot controller to control the position of the horns 222 and 226 in space as it moves the filament placement and consolidation module. FIG. 19 shows ribbons 246 being compacted by the roller horns 222 and ribbons 248 being compacted by the roller horns 226, where the roller horns 226 also compact edges of the ribbons 246.

Figure 20:
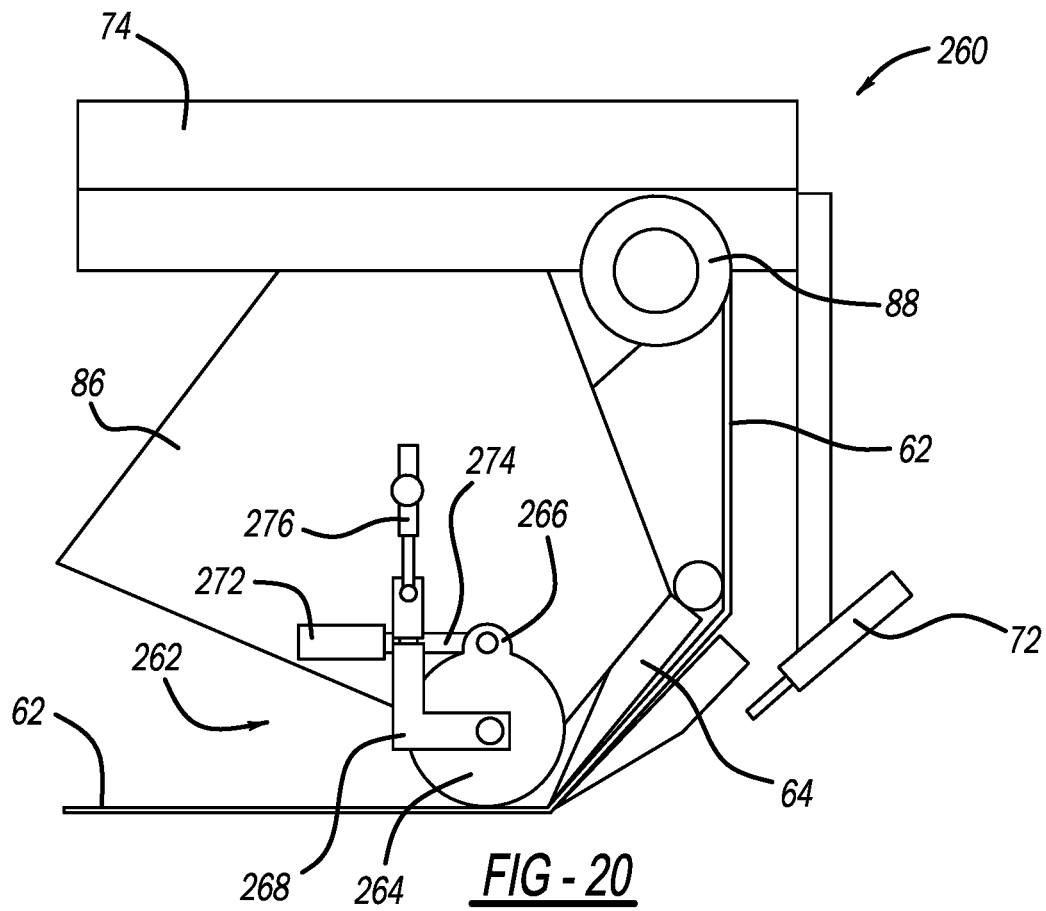
FIG. 20 is a broken-away side view of a continuous fiber placement module including an ultrasonic compaction device having a reciprocating disk horn that can be used in the end-effector for the machine shown in FIG. 1.

FIG. 20 is a broken-away side view of a continuous filament placement module 260 similar to the module 60, where like elements are identified by the same reference number. In this design, the ultrasonic compaction device 76 is replaced with an ultrasonic compaction device 262, where FIG. 21 is a top view and FIG. 22 is a front view of the device 262 separated from the module 260. The device 262 includes a circular reciprocating horn 264 having a top tab 266 and being rigidly mounted at a central location to a frame 268. The device 262 further includes an ultrasonic driver 272 coupled through a booster 270 to a rod 274 that is also coupled to the tab 266, where the driver 272 vibrates the horn surface where it contacts the ribbon 62 back and forth in the direction that the ribbon 62 is being laid down. A pair of pneumatic devices 276 and 278 are coupled to the frame 268 and apply downward pressure on the horn 264. It is noted that in some cases the pneumatic devices 276 and 278 can be eliminated and the position of the roller horns fixed in space by the robotic device manipulation the compaction end effector.

Figure 24:
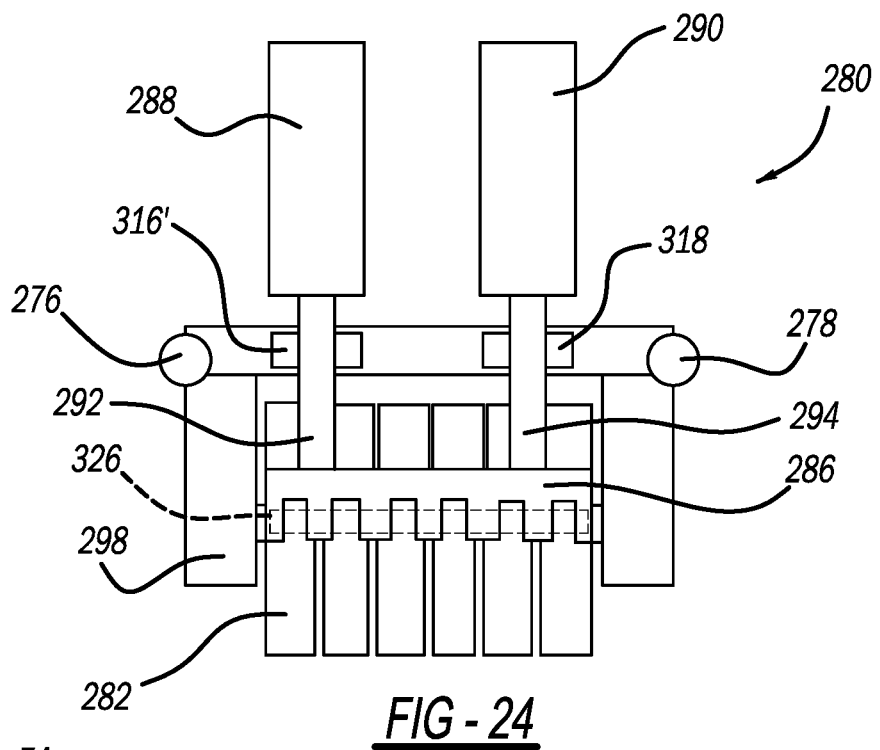
FIG. 24 is a top view of the device shown in FIG. 23.

FIG. 23 is a front view and FIG. 24 is a top view of an ultrasonic compaction device 280 similar to the compaction device 262, but where the single horn 264 is replaced with a plurality of spaced apart circular reciprocating horns 282 each having a top tab 284, where like elements are identified by the same reference number. The horns 282 are rotatably secured to a shaft 296 that is mounted to a frame 298. A coupling bar 286 is coupled to all of the tabs 284 through tabs on the coupling bar 286 and a pin 326 running through the tabs on the coupling bar 286, and a pair of ultrasonic drivers 288 and 290 are coupled through boosters 316 and 318 to the coupling bar 286 by rods 292 and 294, respectively. It is noted that the device 280 is shown with two ultrasonic driver sets, but could be driven with one or more than two as the need arises.

Figure 25:
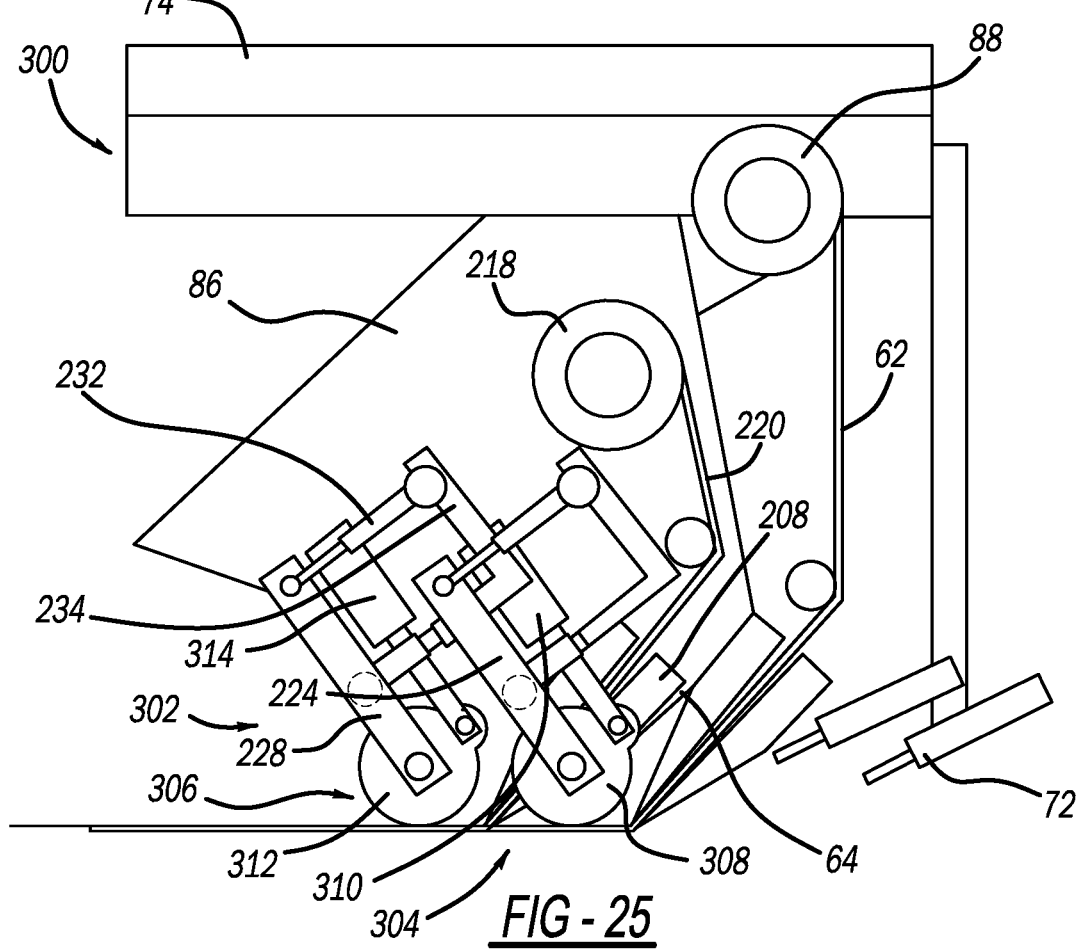
FIG. 25 is a broken-away side view of a continuous filament placement module including an ultrasonic compaction device assembly having two staggered rows of ultrasonic compaction devices with multiple circular reciprocating disk horns and independent compaction motion to follow contoured surfaces that can be used in the end-effector for the machine shown in FIG. 1.
Figure 26:
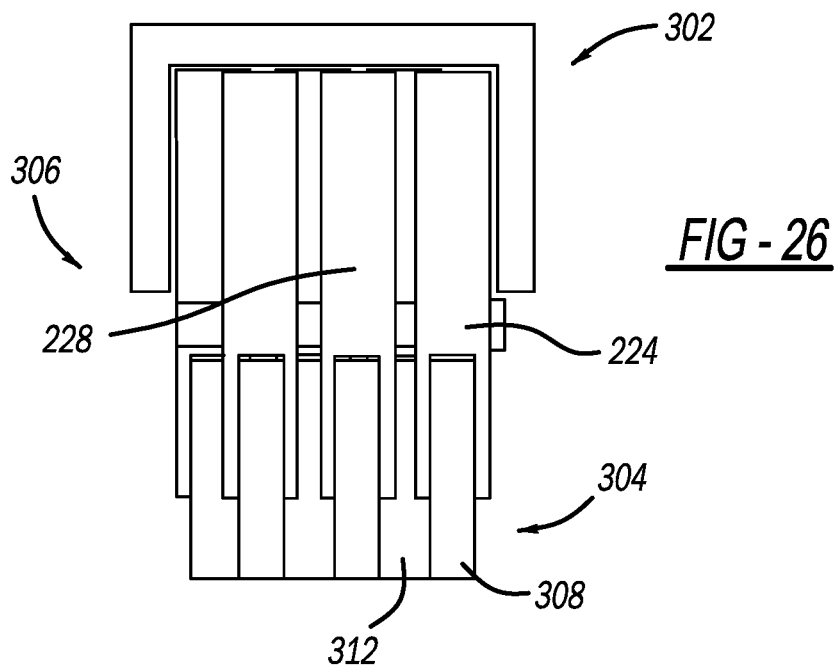
FIG. 26 is a front view of the ultrasonic compaction device assembly shown in FIG. 25.

FIG. 25 is a broken-away side view of a continuous filament placement module 300 similar to the module 210, where like elements are identified by the same reference number. In this design, the ultrasonic compaction assembly 212 is replaced with an ultrasonic compaction device assembly 302 including a front ultrasonic compaction device 304 and a rear ultrasonic compaction device 306. Instead of employing roller horns, the devices 304 and 306 employ circular reciprocating horns 308 and 312 that are vibrated by individual ultrasonic drivers 310 and 314, respectively, to give motion at the contact point with the ribbon 62 and the ribbon 220 in the direction that the ribbons 62 and 220 are being laid down. FIG. 26 is a front view of the assembly 302 separated from the module 210 similar to FIG. 18 showing the staggered overlap between the horns 308 and 312.

Figure 27:
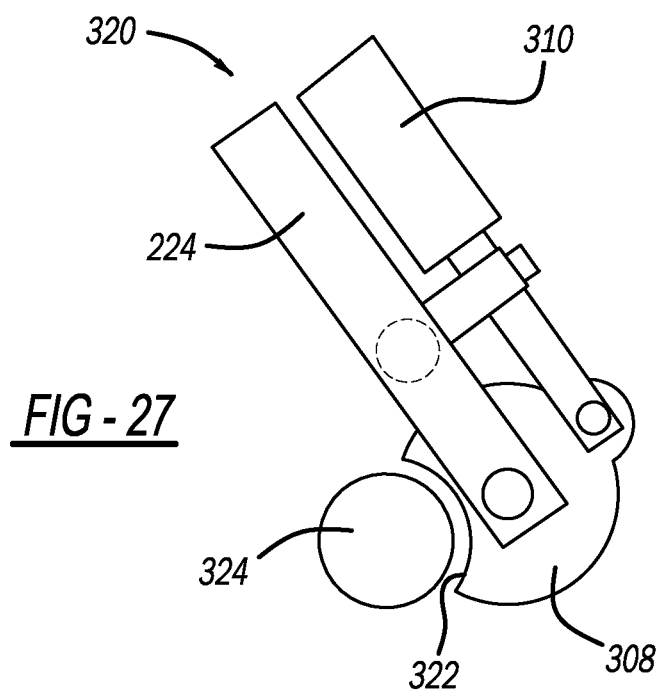
FIG. 27 is a side view of an ultrasonic compaction device including a circular reciprocating disk horn having a cut-out portion that provides space for a close following compaction/cooling roller.

Various embodiments of the reciprocating ultrasonic horns discussed above are circular. However, it is not necessary that they be circular because only the contact point between the horn and the ribbon 62 creates the ultrasonic heating. FIG. 27 is a side view of an ultrasonic compaction device 320 similar to the ultrasonic compaction device 304, where like elements are identified by the same reference number. In this design, a circular notch 322 is formed in a backside of the horn 308 and a roller 324 is positioned in the notch 322, where the roller 324 operates in the same manner as the roller 86 discussed above.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A continuous filament additive manufacturing machine for building a part by laying down a continuous monofilament or continuous composite filament material layer by layer on a tool or substrate, said machine comprising:
a system operable to move in at least three degrees of freedom; and
a placement module coupled to the system and being configured to deposit the continuous filament material, said placement module including a guide for guiding the material to the part, a pre-heat source configured and positioned for heating the filament material before and as it is being deposited from the placement module and at least one compaction device configured and positioned for compacting the material as it is being deposited from the placement module, said at least one compaction device including at least one ultrasonic horn that is ultrasonically vibrated to melt or flow the material and cause the material to fuse and be compacted to the tool or substrate, wherein the placement module further includes a chilled skid that helps compact and cool the material as it is being deposited, said chilled skid being non-circular, and wherein the pre-heat source is mounted to a leading side of the placement module and the pre-heat source is an induction heater.

2. The machine according to claim 1, wherein the continuous filament material is a continuous ribbon made up of multiple continuous filaments pre-fused together.

3. The machine according to claim 1, wherein the placement module further includes a pressure device for pressing the at least one compaction device against the material as it is being deposited.

4. The machine according to claim 3, wherein the pressure device is a pneumatic pressure device.

5. The machine according to claim 1, wherein the placement module is programmably positioned in space by the system to achieve compaction.

6. The machine according to claim 1, wherein the continuous composite filament material is a short fiber reinforced filament, a particle filled filament, a blended monomer filament, a continuous fiber filament or a long discontinuous reinforced filament.

7. The machine according to claim 1, wherein the continuous composite filament material is made of only one material.

8. The machine according to claim 1, wherein the at least one ultrasonic horn starts as a cylindrical horn and is shaped at its tip or end for a particular application.

9. The machine according to claim 1, wherein the at least one ultrasonic horn starts as a flat horn and is shaped at its tip or end for a particular application.

10. The machine according to claim 1, wherein the at least one ultrasonic horn is a plurality of spaced apart ultrasonic horns.

11. The machine according to claim 10, wherein the plurality of ultrasonic horns are configured in two separate rows of horns where the horns are off-set from each other so that the horns in one row compact every other filament or ribbon of filaments and the horns in the other row compact the other filament or ribbon of filaments.

12. The machine according to claim 11, wherein the horns are spaced relative to each other and sized so that there is an overlap of compaction footprint on the material as it is being deposited by the placement module.

13. The machine according to claim 1, wherein the at least one compaction device is a plurality of compaction devices each including a plurality of ultrasonic horns, and wherein the plurality of horns in one compaction device are staggered relative to the plurality of horns in another compaction device.

14. The machine according to claim 13, wherein the horns are spaced relative to each other and sized so that there is an overlap of compaction footprint on the material as it is being deposited by the placement module.

15. The machine according to claim 1, wherein the system is a robot.

16. The machine according to claim 1, wherein the compaction device is mounted to a following side of the module.

17. A continuous filament additive manufacturing machine for building a part by laying down a continuous mono-filament or continuous composite filament material layer by layer on a tool or substrate, said machine comprising:
- a robot operable to move in at least three degrees of freedom; and
- a placement module coupled to the robot and being configured to deposit the filament material, said placement module including a guide for guiding the material to the part, an infrared heater coupled to a leading side of the module configured and positioned for pre-heating the substrate and the incoming material as it is being deposited from the placement module, a compaction device coupled to a following side of the module configured and positioned for compacting the material as it is being deposited from the placement module and a following device for holding a consolidation of the material as it is solidifying, said compaction device including an ultrasonic horn that is ultrasonically vibrated to melt or flow the material and cause the material to fuse and be compacted to the tool or substrate, said placement module further including a non-circular chilled skid that helps compact and cool the material as it is being deposited.

18. The machine according to claim 17, wherein the placement module further includes a pressure device for pressing the at least one compaction device against the material as it is being deposited.

19. The machine according to claim 17, wherein the placement module is programmably positioned in space by the system to achieve compaction.

20. The machine according to claim 17, wherein the continuous filament material is a continuous ribbon made up of multiple continuous filaments pre-fused together.

21. The machine according to claim 17, wherein the continuous composite filament material is a short fiber reinforced filament, a particle filled filament, a blended monomer filament, a continuous fiber filament or a long discontinuous reinforced filament.

22. The machine according to claim 17, wherein the continuous composite filament material is made of only one material.

* * * * *